S. P. LANGSFORD & W. N. STROUD.
SULKY ATTACHMENT FOR PLOWS.
No. 185,338. Patented Dec. 12, 1876.
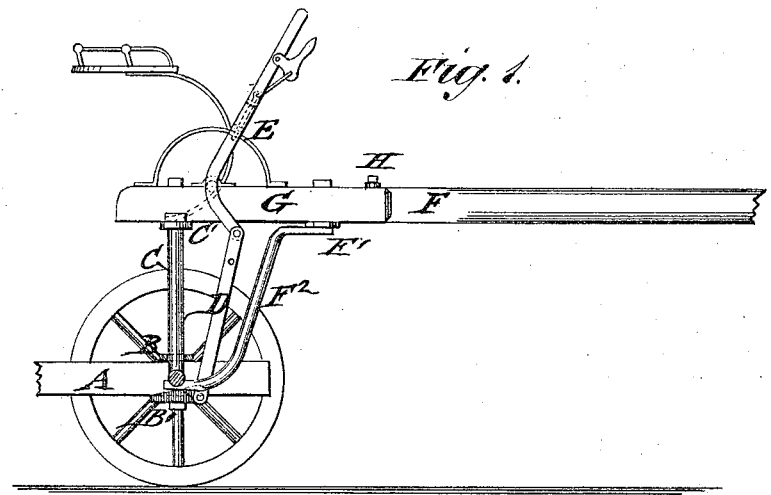
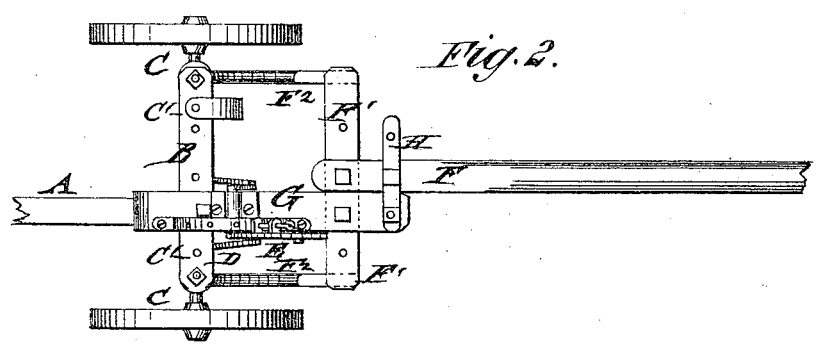
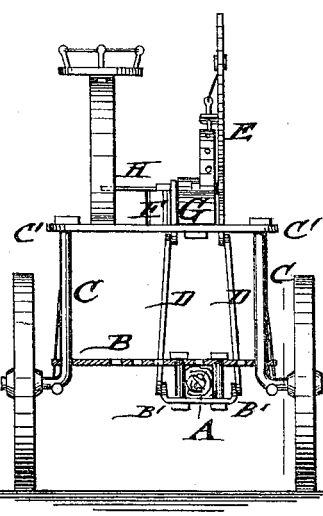

UNITED STATES PATENT OFFICE.

SAMUEL P. LANGSFORD AND WILEY N. STROUD, OF WAXAHACHIE, TEX.

IMPROVEMENT IN SULKY ATTACHMENTS FOR PLOWS.

Specification forming part of Letters Patent No. 185,338, dated December 12, 1876; application filed August 21, 1876.

*To all whom it may concern:*

Be it known that we, SAMUEL P. LANGSFORD and WILEY NICHOLS STROUD, of Waxahachie, in the county of Ellis and State of Texas, have invented a new and Improved Sulky Attachment to Plows, of which the following is a specification:

In the accompanying drawing, Figure 1 represents a sectional side elevation, Fig. 2 a top view, and Fig. 3 a sectional rear elevation, of our improved sulky attachment to plows.

Similar letters of reference indicate corresponding parts.

Our invention relates to an improved sulky attachment to plows, by which a farmer is enabled to apply any kind of plow to the sulky-frame, and thereby do all his work with the same without having to walk in plowing.

The invention consists of a sulky-frame, to which the plow-beam is rigidly applied, the connecting-pieces and tongue being capable of adjustment to the position of the plow-beam on a vertically-sliding cross-piece, which is raised or lowered, so as to elevate or depress the plow, by lever-connection with the seat of the sulky.

In the drawing, A represents the plow-beam of any kind or size of plow, whether a right or left hand, cultivating, or other plow. The plow-beam A is attached by fastening-bolts and binding-plate or shoe B' at the under side to a sliding cross-piece, B, that is provided with a number of perforations, so that the beam of any kind of plow may be attached thereto. The cross-piece B slides on the vertically-bent axles C of the sulky-frame, which are connected at the upper ends by a lateral top piece, C'. The cross-piece holds the plow perfectly stationary and from playing sidewise, holding also the axles to their proper position. The plow-beam is raised or lowered by lever-rods D, attached to the plate or shoe B', and by a crank-rod, E, that is set, in the usual manner, to an arc-shaped guide. The lever is operated by the plow-man from the seat, and serves to throw the plow either in or out of the ground to any depth or height, so as to be raised to pass over stumps, or turn or go from one field to another, or to the repair-shop. The lever mechanism is arranged on a longitudinal piece, G, that is bolted to the perforated top piece C', and to a lateral front piece, $F^1$, which is supported on the strong braces $F^2$, that are rigidly secured to and extended forward from the axles C. The holes of the top cross-pieces C' and $F^1$ serve to adjust the piece G and the tongue F into position vertically above and in line with the plow-beam. The tongue can be adjusted for either two, three, or four horses, as desired. The tongue is bolted to the front cross-piece $F^1$, and further attached to piece $F^1$ by a short perforated cross brace or strip, H, which secures the rigid connection of the tongue with the sulky-frame at whatever portion the plow-beam, top piece, and tongue have to be applied to the same. In this manner one sulky attachment serves for the different plows used by a farmer, and facilitates his work in plowing.

Having thus described our invention, we claim as new and desire to secure by Letters Patent—

The perforated bar B, sliding on vertical bends of short axles, and the shoe B', connected therewith by two bolts, in combination with the two rods D D, passing through fixed perforated plate C', and operated by the bifurcated lever E, as and for the purpose specified.

SAMUEL P. LANGSFORD.
WILEY N. STROUD.

Witnesses:
J. B. MEREDITH,
T. PATTERSON.